United States Patent [19]

Pate

[11] 4,225,103
[45] Sep. 30, 1980

[54] PIPE CLAMP DEVICE

[75] Inventor: Harold T. Pate, Cleveland, Ohio

[73] Assignee: Indian Head Inc., New York, N.Y.

[21] Appl. No.: 970,482

[22] Filed: Dec. 18, 1978

[51] Int. Cl.³ .............................................. F16H 3/08
[52] U.S. Cl. .................................. 248/74 B; 138/107
[58] Field of Search .................. 138/106, 107; 248/73, 248/74, 74 A, 74 B, 74 PB

[56] References Cited

U.S. PATENT DOCUMENTS

| | | | |
|---|---|---|---|
| 2,366,456 | 1/1945 | Pheazey | 248/73 |
| 3,244,388 | 4/1966 | Coffman | 138/107 X |
| 3,275,274 | 9/1966 | Hutcheon | 248/73 X |
| 3,650,499 | 3/1972 | Biggane | 248/74 R X |
| 3,684,220 | 8/1972 | Logsdon | 248/56 |
| 3,684,223 | 8/1972 | Logsdon | 248/74 PB |
| 3,848,840 | 11/1974 | Umezu | 248/74 PB X |

FOREIGN PATENT DOCUMENTS

1108526  6/1961  Fed. Rep. of Germany ........... 138/106

Primary Examiner—James C. Mitchell
Attorney, Agent, or Firm—William R. Laney

[57] ABSTRACT

A clamp for suspending a pipe from a strut, the clamp including an elongated flexible strap carrying pipe spacing protuberances on one side, and having tee subassemblies at opposite ends. The tee subassemblies each define a tool-receiving slot aligned with a neck portion of the respective tee subassembly. The clamp is used in combination with a strut channel having an open mouth and reverse turned edges at opposite sides of the open mouth.

27 Claims, 15 Drawing Figures

PIPE CLAMP DEVICE

BACKGROUND OF THE INVENTION

1. Field of the Invention

This invention relates to pipe clamping devices used for mounting or supporting tubular elements, such as conduit or pipe, on a supporting structure, such as a wall or ceiling, and more particularly, to pipe clamping devices which can be used for quickly hanging or suspending a pipe from a channel strut secured to a supporting structural element.

2. Brief Description of the Prior Art

Various clamp devices have been heretofore proposed for supporting a pipe or other tubular member from a wall, ceiling or some type of stationary fixture. It is desirable with such devices to prevent contact between the pipe or tubular element and the wall, ceiling or other supporting structure, thereby minimizing heat transfer to these structures and, in some instances, avoiding electrolysis by reason of direct contact of dissimilar metals. Such clamp devices often take the form of jaws which totally or partially encircle the pipe, and provide flanges of some configuration which can be nailed or in other ways secured to the stationary supporting structure to support the pipe therefrom. Examples of pipe clamps of the type described are those shown in Logsdon U.S. Pat. No. 3,684,223, Logsdon U.S. Pat. No. 3,684,220 and those clamps which are currently manufactured and sold by the Specialty Products Company as illustrated in the brochure being filed concurrently with this application, and representing, with the Logsdon patents, that prior art which is the closest to the present invention which is now known to me.

In some instances, a pipe clamp is constructed to permit it to be suspended from an open mouth strut or channel bar, and to prevent contact between the pipe and the strut or channel bar. Where this construction is employed, tabs or flanges are used to extend through the open mouth of the channel bar and engage inturned toes or edges carried adjacent this open mouth and thereby hang the clamp from within the strut or channel bar. A strut clamp of this type is marketed by the Specialty Products Company, and is illustrated in the brochure of that company being filed with the present application.

BRIEF DESCRIPTION OF THE PRESENT INVENTION

The present invention provides a clamp which can be utilized to quickly locate and suspend or mount a pipe or other tubular element from an open-mouthed, channel-type strut, either manually and with no tools, or using only hand tools to place the clamp in engagement with the strut, and to locate the pipe within the clamp.

Broadly described, the pipe clamp of the invention comprises an elongated, flexible strap having pipe spacing protuberances on at least one side of the strap and spaced from each other along its length; a transverse stop flange secured to each of the opposite ends of the strap and each extending substantially normal to the longitudinal axis of the strap and having a length which is greater than the width of the strap; and a tee element connected to each of said stop flanges at opposite ends of the strap and projecting from the stop flange on the opposite side thereof from the side of the respective stop flange which is joined to the strap. Each of the tee elements includes a flexible and resilient neck portion and a crossarm element. At least one of the crossarm elements includes and defines a tool-engaging slot aligned with the neck portion of the respective tee element carrying such tool-engaging slot, whereby the tee element carrying the toolengaging slot can be twisted on its neck portion relative to the projected longitudinal axis of the strap. This can be accomplished with a hand tool, or in some cases, manually, at the option of the installer.

The invention further contemplates a combination which includes the pipe clamp of the invention and a channel-type strut. The strut includes an elongated, generally C-shaped body having an open mouth at one side thereof, and having a pair of reverse turned edges at opposite sides of the open mouth. The clamp is engaged with the described strut by projection of the reverse turned edges of the strut into spaces provided between the crossarm elements of the two tee elements located at opposite ends of the clamp strap, and the stop flanges secured to the opposite ends of the clamp strap.

In a preferred embodiment of the invention, each tee section includes beveled edges which terminate at inclined locking tabs located at opposite ends of the respective tee subassembly crossarm elements. These plane tabs are offset or staggered relative to the main plane of the pipe clamp device, and the arrangement is such that the clamp cannot be easily removed from a channeltype strut after installation. The highest edges of the tabs act as safety locks to prevent the tee elements from slipping over the reverse turned edges at opposite sides of the open mouth of the strut. This also adds to the load bearing capability of the clamp.

An important object of the invention is to provide a simply configured and constructed pipe clamp which can be used for stably and firmly holding and supporting an elongated pipe or other conduit by attachment of the clamp to an elongated strut secured to a wall, ceiling or other structural member.

A further object of the invention is to provide a strut engaging strap type clamp which can be very quickly installed at any place along a channel-type strut mounted stationarily on a supporting structure in a way which permits a pipe to be held by the clamp in juxtaposition to the strut without sagging or displacement of the pipe.

Another object of the invention is to provide a pipe clamp which can be used for clamping a pipe in a suspended position from a strut, effecting the clamping of the pipe in the pipe clamp with or without the use of simple hand tools.

A further object of the invention is to provide a pipe clamp which can be used for suspending a pipe or other tubular member from a stationary strut of channel configuration, with the pipe, when so suspended, being thermally insulated from contact with the strut or any other structural element, and providing for maximum ventilation between the pipe and the clamp, and minimum thermal transfer between the pipe and the clamp.

Additional objects and advantages of the invention will become apparent as the following detailed description of preferred embodiments of the invention is read in conjunction with the accompanying drawings which illustrate such preferred embodiments.

DETAILED DESCRIPTION OF PREFERRED EMBODIMENTS OF THE INVENTION

Figure 1:
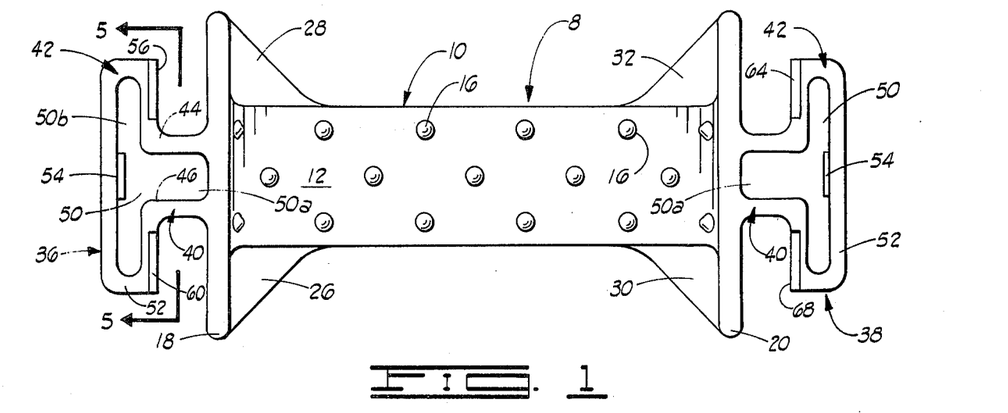
FIG. 1 is a plan view of a pipe clamp constructed in accordance with the present invention.
Figure 2:
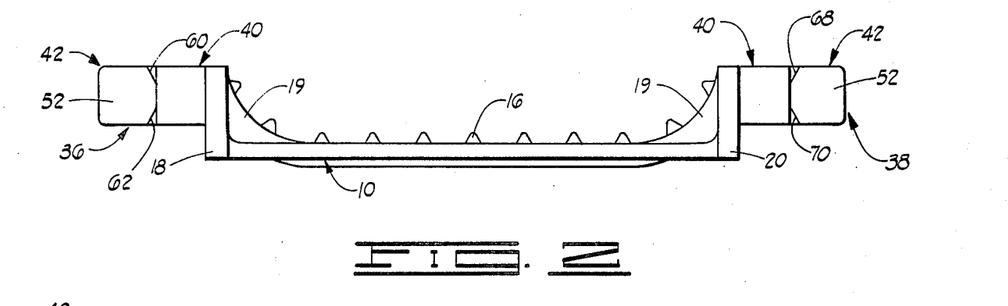
FIG. 2 is a side elevation view of the pipe clamp shown in FIG. 1.
Figure 3:
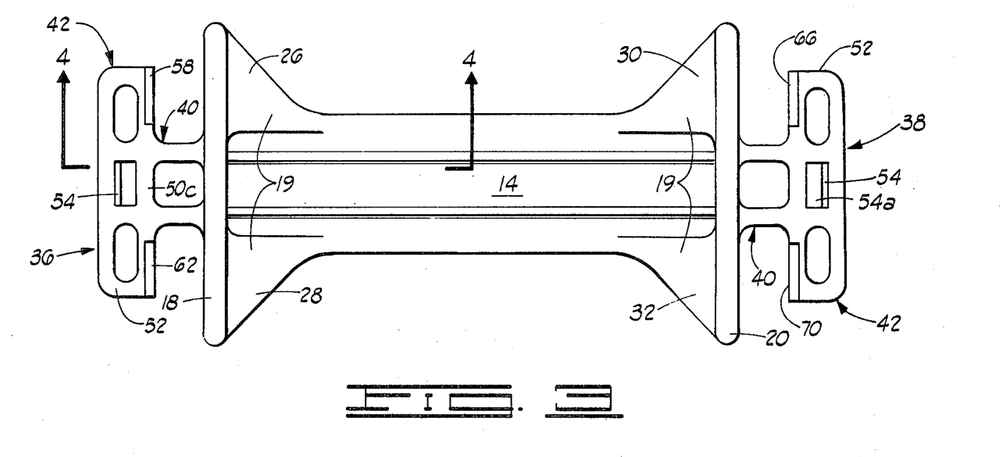
FIG. 3 is a bottom plan view of the pipe clamp shown in FIG. 1.

The pipe clamp 8 of the invention includes an elongated, flexible strap 10 of rectangular configuration and including a first side 12 and a second side 14. The strap includes parallel side edges defining the first and second sides. The first side 12 has a plurality of pipe spacing protuberances 16 formed thereon at spaced intervals and over a major portion of its length. At its opposite ends, the elongated strap 10 is secured to a pair of transversely extending, substantially rectangular stop flanges 18 and 20. Arcuate web portions 19 are disposed centrally across the transverse width of the strap member 10 adjacent each of its opposite ends and project between the surface 12 of the strap member and one side of the respective stop flanges 18 and 20. The arcuate web portions 19 define outwardly facing concave surfaces formed on an arc of a circle and also carrying some of the pipe spacing protuberances 16. Gusset elements 26 and 28 also join the side edges of the strap member 10 to the stop flange 18, and similar gusset members 30 and 32 join such side edges to the stop flange 20.

Secured to the opposite side of the stop flange 18 from that side which is joined to one end of the elongated strap 10 is a tee subassembly designated generally by reference numeral 36. A similar tee subassembly 38 is secured to the stop flange 20 on the opposite side thereof from the side which is joined to one end of the strap 10. In the illustrated embodiment of the invention, the tee subassemblies 36 and 38 are substantially identically constructed, and each includes a flexible, resilient neck portion 40 and an elongated crossarm element 42.

Figure 4:
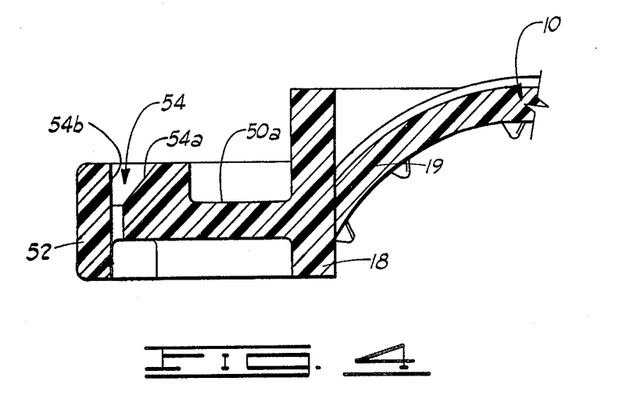
FIG. 4 is a sectional view taken along line 4—4 of FIG. 3.
Figure 5:
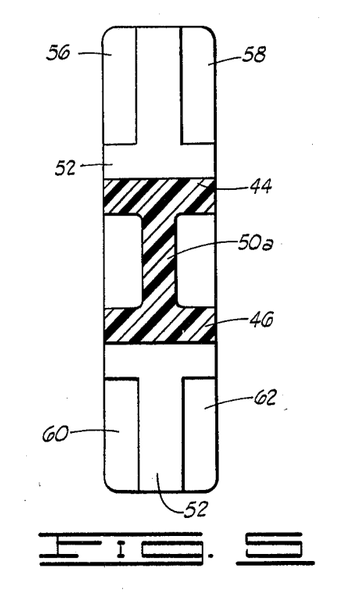
FIG. 5 is a sectional view taken along line 5—5 of FIG. 1.

Each neck portion 40 includes a pair of lateral flanges 44 and 46 which are secured to opposite side edges of a neck extension 50a of a central plate 50. The central plate 50 further includes a crossarm portion 50b which lies within a peripheral flange 52 which peripherally borders or lies at the outer side of the crossarm element 42 of the respective tee subassembly 36 or 38. At a central location in line with the neck extension 50a of the central plate 50, and in alignment with the longitudinal axis of the strap member 10, the crossarm portion 50b of the central plate 50 is slotted and defines with the peripheral flange 52, the slot 54 extending through the crossarm element 42 at this location (see FIGS. 1 and 4). The slot 54 is defined in part by a beveled side 54a and a straight side 54b. The tool-engaging slot 54 is best illustrated in FIGS. 3 and 4 of the drawings.

Figure 6:
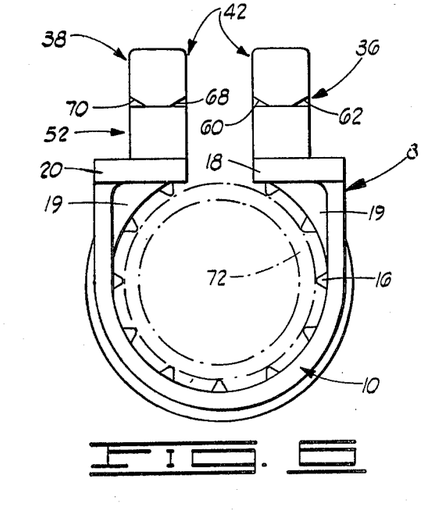
FIG. 6 is an end elevation view of the pipe clamp of the invention, and further illustrating in dashed lines the position of a pipe within the pipe clamp at a time when the pipe is engaged in the position in which it is located when the clamp is used to support the pipe from a stationary strut.

It will be noted in referring to the drawings that the crossarm elements 42 are substantially rectangular in shape and are spaced by the respective neck portions 40 from the respective stop flanges 18 and 20. The crossarm elements 42 are further characterized in including a pair of opposed beveled surfaces disposed on the opposite ends thereof. Thus, as shown in FIGS. 2, 3 and 6, the crossarm element 42 of the tee subassembly 36 includes a pair of beveled surfaces 56 and 58 on one end thereof, and a second pair of beveled surfaces 60 and 62 on the opposite end thereof. Similarly, the crossarm element 42 of the tee subassembly 38 includes a pair of beveled surfaces 64 and 66 on one end thereof, and a pair of beveled surfaces 68 and 70 on the opposite end thereof.

Figure 7:
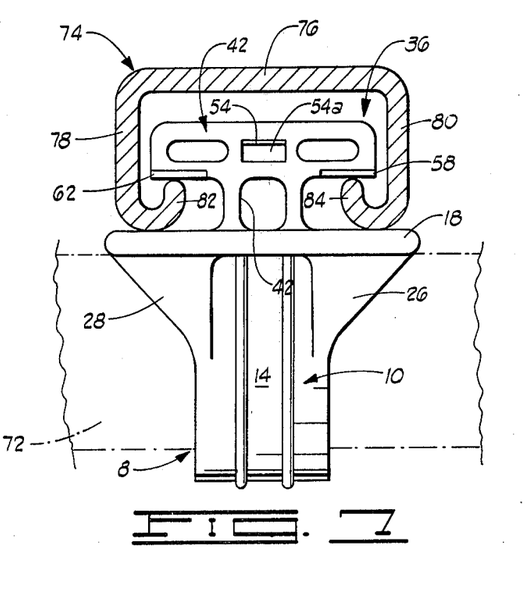
FIG. 7 is a side elevation view of the pipe clamp of the invention mounted in a stationary strut, and illustrating in dashed lines, a pipe or conduit extending through, and engaged by, the clamp.

The manner in which the pipe clamp device of the invention is utilized for supporting a pipe from an elongated strut or channel bar is best illustrated in FIGS. 6 and 7 of the drawings. FIG. 6 illustrates the manner in which the clamp device 8 is used for encircling and engaging a pipe or conduit 72. It will be understood that the strap 10 is made of a flexible material, and that the neck portions 40 forming portions of the tee subassemblies 36 and 38 are made of a flexible and resilient material, all as hereinbefore described. Preferably, the entire clamp device is molded from a suitable synthetic resin, having good tensile strength and aging characteristics.

In use, the clamp device retains the pipe 72 within an encircling and confining structure formed by the strap 10, the web portions 19 and the pipe spacing protuberances 16. It will be noted that in the pipe engaging status, the strap 10 is flexed so that it is bent through an angle of 180° as defined by its longitudinal axis. When the strap 10 is flexed in this manner, the web portions 19, by reason of their configuration, lie on complimentary arcs of the same circle, and the effect is to place the pipe spacing protuberances 16 carried thereby in a collective array, along with the remaining protuberances 16 carried on the strap 10, such that they will contact, at a plurality of points, the pipe or conduit 72 placed therein. The tee subassemblies 36 and 38 are then positioned for engagement with a strut or channel bar.

When the clamp device is to be engaged with the strut or channel bar, it is positioned in the manner shown in FIG. 7. In that figure of the drawings, an elongated strut or channel bar is shown in section and is denominated by reference numeral 74. The strut includes a web 76 having a pair of substantially parallel legs 78 and 80 secured to the side edges of the web. The legs 78 and 80 are terminated in in-turned edge portions 82 and 84 which define an opening to the interior of the strut 74. The strut 74 is normally secured to a ceiling or wall so that the opening to the interior generally faces downwardly or outwardly. In some installations, however, the pipe may rest upon the strut. In these cases, the clamp functions to align the pipe with the strut and adjacent piping runs to provide adequate spacing, and to hold the conduit off the strut surface.

In order to mount the clamp device 8 of the present invention in the strut 74, one of the tee subassemblies 36 or 38 is initially placed within the interior of the strut by first aligning the crossarm element 42 thereof with the opening between the in-turned edge portions 82 and 84 so that the crossarm element can pass freely to the interior of the strut. At a time when the stop flange 18 or 20, associated with the respective tee subassembly 36 or 38 which is placed within the interior of the strut, has been brought to bear against the convex outer and lower sides of the in-turned edge portions 82 and 84, the entire clamp device 8 is rotated about the longitudinal axis of the strap 12 so that the crossarm element 42 within the strut is brought into a transverse position as illustrated in FIG. 7. In assuming this position, the beveled surfaces, such as 58 and 62 and their counterparts 56 and 60, function to wedgingly move the crossarm element 42 inside the strut 74 into a position where it bridges across and rests upon the in-turned edge portions 82 and 84. These edge portions are thus clamped firmly between the crossarm element 42 inside the strut and the respective stop flange 18 or 20 (the stop flange 18 is that which is illustrated in FIG. 7).

After insertion of one of the tee subassemblies 36 and 38 into the interior of the strut 74 in the manner described, and reorientation of the clamp device 8 so that the crossarm element 42 of the tee subassembly 36 extends transversely with respect to the longitudinal axis of the strut, the elongated flexible strap 10 is then wrapped about the periphery of the pipe 72 which is to be clamped within the clamp device and suspended from the strut.

When the strap 10 is wrapped about the pipe 72 in the manner described, the pipe spacing protuberances 16 contact the outer periphery of the pipe in the manner illustrated in FIG. 6. With the pipe 72 encircled by the strap 10 in this fashion, the second of the tee subassemblies 38 is then placed on the interior of the strut 74 by twisting the crossarm element 42 of this tee subassembly upon the neck portion thereof. This is accomplished by inserting the point of a screwdriver or similar implement in the slot 54, and using the shaft of the screwdriver to provide the leverage necessary to twist the crossarm element 42 on the flexible and resilient neck portion 40. The crossarm element 42 is thus twisted to a location where it is then in a plane permitting it to pass through an opening between the in-turned edge portions 82 and 84 and up into the interior of the strut 74. The screwdriver or other implement can then be used to push the crossarm element 42 through the opening between the in-turned edges 82 and 84 and into the interior of the strut.

Once the crossarm element 42 is in this location, the screwdriver can be withdrawn to permit the crossarm element to pivot back to its relaxed status in which it extends transversely with respect to the longitudinal axis of the strut 74. At this time, the clamp device 8 appears as shown in FIGS. 6 and 7 with the crossarm elements 42 of the two tee subassemblies 36 and 38 aligned in parallel and extending transversely across the strut in contact with the in-turned edge portions 82 and 84. Both of the stop flanges 18 and 20 located at opposite ends of the flexible strap 10 bear against the lower sides of the in-turned edge portions 82 and 84 to help retain the clamp device in the selected location along the strut 74, and to prevent swiveling or pivoting action of the clamp within the strut. On some occasions, the clamp will be connected to the strut by inserting both crossarm elements 42 in the strut before the pipe is inserted into the encircling strap of the clamp as thus mounted. In this type of installation, no tools are needed.

Figure 8:
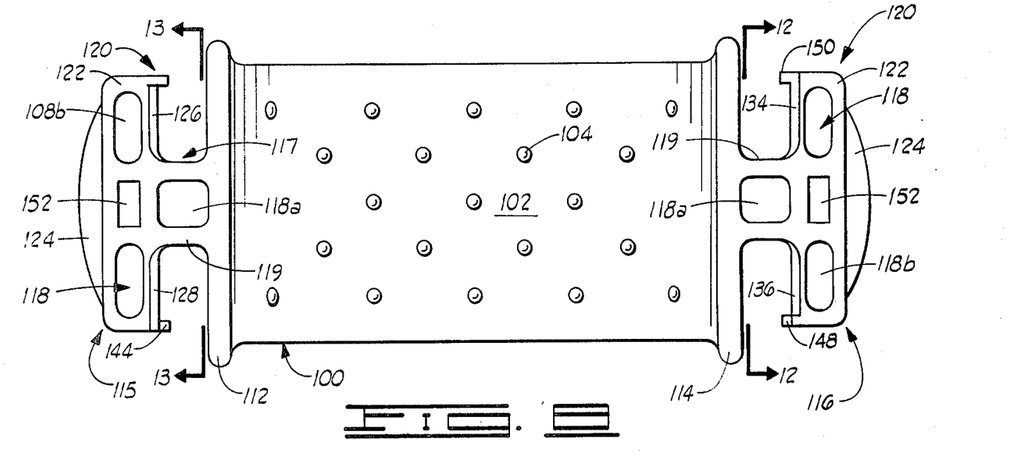
FIGS. 8–11 depict a different embodiment of the pipe clamp of the invention, with respective correspondence, in sequence, to the types of views of the first embodiment as illustrated in FIGS. 1–4.
Figure 9:
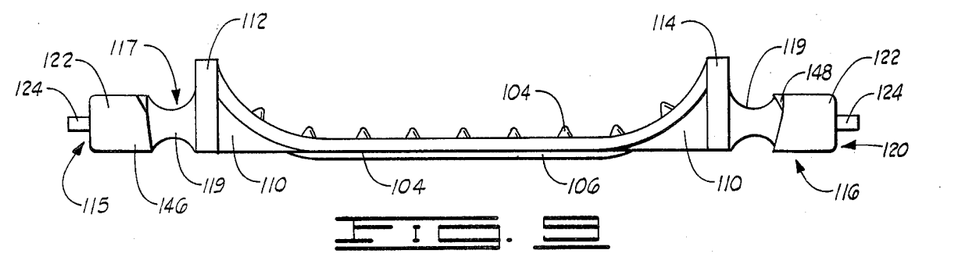
Figure 10:
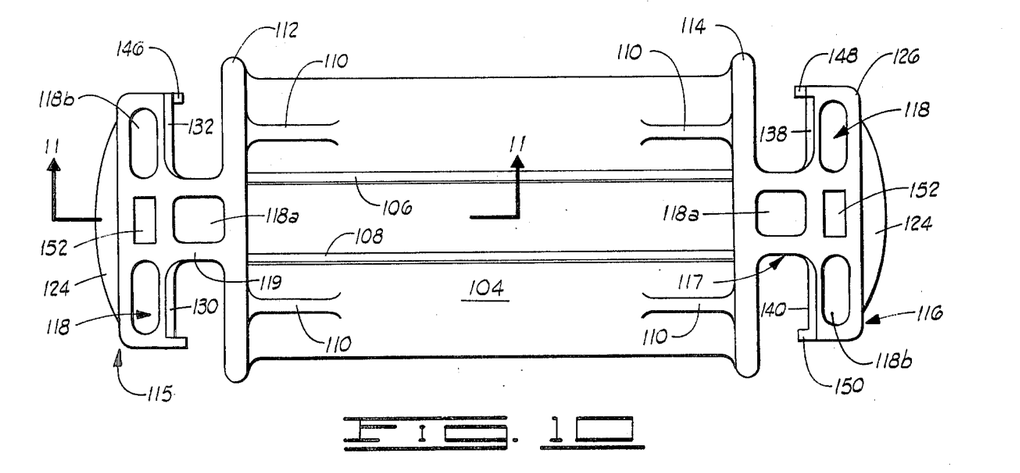
Figure 11:
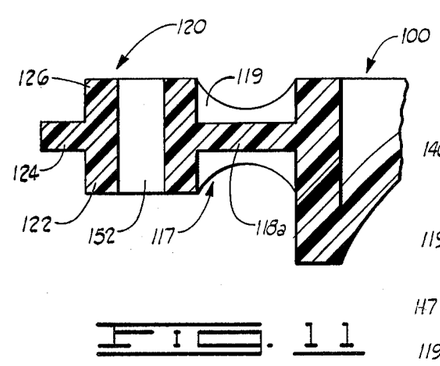

A modified and preferred embodiment of the invention is illustrated in FIGS. 8–15. In this embodiment, an elongated flexible strap 100 is utilized which has a substantially greater width than the strap 10 used in the embodiment of FIGS. 1–11. The strap 100 has a first side 102 which carries the pipe spacing protuberances 103 at spaced intervals therealong. The strap also has a second flat side 104, as shown in FIG. 10, which carries a pair of longitudinally extending reinforcing ribs 106 and 108. Pairs of transversely spaced gusset webs 110 are provided at opposite ends of the strap 100 on the underside 104 thereof, and extend between this surface of the strap and a pair of transversely extending stop flanges 112 and 114 located at opposite ends of the strap 100. The transversely extending stop flanges 112 and 114 are of substantially the same width and geometric configuration as the stop flanges 18 and 20 used in the earlier described embodiment of the invention.

Connected to the central portion of each of the stop flanges 112 and 114 are a pair of tee subassemblies 115 and 116. Each of the tee subassemblies 115 and 116 includes a neck portion designated generally by reference numeral 117. As in the case of the neck portions 40 forming parts of the embodiment of the invention hereinbefore described, each of the neck portions 117 includes a central plate neck 118a constituting a portion of a central plate 118. Each neck portion 117 further includes lateral flange portions 119 which, as shown in FIG. 9, are radiused inwardly to present opposed concavities. This feature permits the neck portions 117 to be relatively strong and resistant to fracturing or splitting upon twisting during installation of the pipe clamp device, and yet enables such twisting to be accomplished more easily in the case of the embodiment shown in FIGS. 8–15.

Each of the tee subassemblies 115 and 116 further includes a crossarm element 120. Included within each crossarm element 120 is a crossarm portion 118b of the central plate 118, and a peripheral flange portion 122 which extends around the outer periphery of this crossarm portion 118b of the central plate 118 in the manner hereinbefore described.

Figure 12:
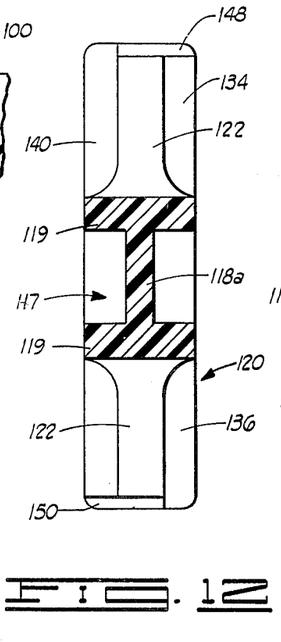
FIG. 12 is a sectional view taken along line 12—12 of FIG. 8.

The tee subassemblies 115 and 116 differ from those described in referring to the embodiment of the invention shown in FIGS. 1–7. Thus, extending across the outer side of the crossarm element of each tee subassembly, in a direction substantially parallel to the two stop flanges 112 and 114, is a reinforcing rib 124 which is configured as a segment of a circle. It will also be noted that, as hereinbefore described, each of the peripheral flange portions 122 of each of the tee subassemblies carries beveled surfaces on the side thereof which faces the respective stop flange 112 or 114. Thus, in the case of the tee subassembly 115, such beveled surfaces are shown at 126 and 128 in FIG. 8, and at 130 and 132 in FIG. 10. Similarly, these figures of the drawing show the beveled surfaces 134, 136, 138 and 140 carried on the inner side of the crossarm element peripheral flange portion 122 of the tee subassembly 116. It will be noted that these various beveled surfaces are disposed on opposite sides of the respective crossarm elements, and near the opposite ends thereof. As best illustrated in FIGS. 8, 10 and 12, each of the beveled surfaces 128 and 132 terminates at a downwardly projecting locking tab of triangular configuration. The locking tab 144 is located adjacent the end of the beveled surface 128, and the locking tab 146 is located at the end of the beveled surface 132, with the tab 144 being located on one side of the plane of the central plate 118 and the tab 146 being disposed on the opposite side of this plane. These locking tabs 144 and 146 project out of the plane of the peripheral flange portion 122 (which extends around the perimeter of the crossarm element 120) of the tee subassembly 115 in the direction of the transversely extending stop flange 112.

Figure 13:
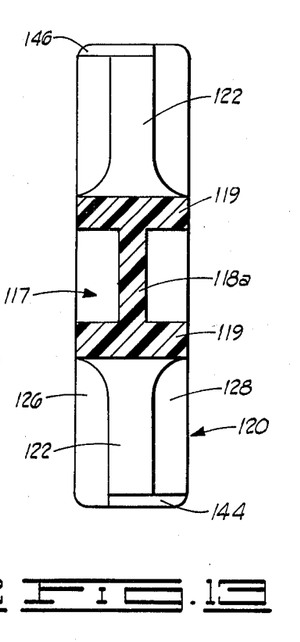
FIG. 13 is a sectional view taken along line 13—13 of FIG. 8.
Figure 14:
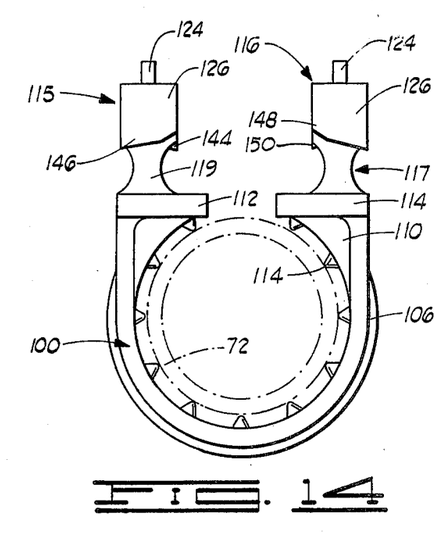
FIG. 14 is a side elevation view similar to FIG. 6, but illustrating the modified clamp.
Figure 15:
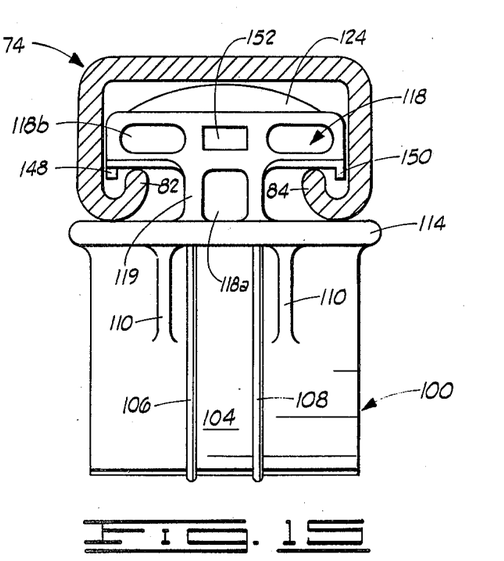
FIG. 15 is a view similar to FIG. 7 illustrating the modified pipe clamp embodiment suspended from a strut.

Referring to FIGS. 8, 10 and 13 it will be noted that the beveled surfaces 134 and 140, like the beveled surfaces 128 and 132, terminate at downwardly projecting tabs 148 and 150, respectively. These two tabs 148 and 150 carried on the crossarm element 120 of the tee subassembly 116 are located on opposite sides of the plane of the central plate 118 of this crossarm element, and project from the peripheral flange portion 122 of this crossarm element toward the stop flange 114. It will be noted in referring to FIGS. 8 and 9 that those locking tabs 146 and 148 which are on aligned, facing ends of the crossarm elements 120 of the two tee subassemblies 115 and 116 are themselves disposed on opposite sides of a common plane extending through, and containing, the central plates 118 of each of the crossarm elements in the two tee subassemblies. This is also the relationship of the tabs 144 and 150. These relationships are further shown in FIG. 14 of the drawings. The described spatial and geometric orientations of the several tabs 144, 146, 148 and 150 are important in the functioning of this embodiment of the invention for mounting the pipe clamp device in an elongated strut in the manner hereinafter described.

A further modification of each of the tee subassemblies 115 and 116 with respect to the tee subassemblies used in the already described embodiment of the invention is the provision of a large, rectangular slot 152 which extends through the central portion of each of the crossarm elements 120.

OPERATION AND USE OF THE MODIFIED EMBODIMENT ILLUSTRATED IN FIGS. 8–15

The manner in which the embodiment of the invention illustrated in FIGS. 8–15 is utilized is quite similar to the manner in which the embodiment previously described is utilized. Initially, the crossarm element 120 of one of the tee subassemblies 115 or 116 is placed within the open mouth between the in-turned edges 82 and 84 of the elongated strut 74. This is accomplished by turning the crossarm element 120 sufficiently angularly with respect to the longitudinal axis of the elongated strut to permit it to pass through this opening between the inturned edges at the lower ends of the legs 78 and 80. After entrance into the interior of the strut is thus achieved, the entire strap is twisted to cause the crossarm element of the tee subassembly which is within the interior of the strut to extend transversely across the strut in a direction normal to the longitudinal axis thereof. With the crossarm element so oriented, the locking tabs 144 and 146 or 148 and 150 carried on opposite ends of the respective crossarm element project downwardly into the recesses or gaps provided in the location where the in-turned edges are turned backwardly into the interior of the strut. This assures security of the tee subassembly within the strut, and prevents the pulling out of the pipe clamp device. The reinforcing flanges 124 provide greater holding power to the pipe clamp when it is placed in tension, and assure greater strength in the crossarm elements 120 of the tee subassemblies 115 and 116.

After wrapping the relatively broad strap 100 about the pipe to be held in the clamp, the second of the two tee subassemblies 115 and 116 is twisted about its respective neck portion 117 so that the crossarm element 120 thereof can be inserted between the in-turned edge portions 82 and 84 of the strut 74. The twisting of the inserted tee subassembly can be facilitated by inserting the point or end of a shaft, such as that characteristic of a screwdriver, in the rectangular slot 152 formed through the respective crossarm element. In some installations, twisting and insertion can be accomplished manually and without the aid of any tools.

After the crossarm element is substantially into the interior of the strut, it is twisted back to an orientation in which it extends substantially normal to the longitudinal axis of the strut. This is aided by the wedging or inclined plane action afforded by the beveled surfaces carried on the lower sides of the peripheral flange portion 122 where it extends on opposite sides of the neck portion 117. Once the crossarm element 117 is disposed across the in-turned edge portions 82 and 84, the tabs function to retain the subassembly within the interior of the strut and prevent its displacement. It should be pointed out that the concave radiusing of the peripheral flange portions 119 of each neck portion 117 permits the neck portion to be more easily twisted as needed to permit the crossarm elements 120 to pass through the opening between the in-turned edge portions 82 and 84 of the strut.

The relatively wide strap 100 provided in the preferred embodiment of the invention, coupled with the provision of the reinforcing ribs 106 and 108, allows the pipe clamp in this form to accommodate and support a relatively heavier pipe or conduit.

From the foregoing description of the invention, it will be perceived that the present invention provides an improved clamp device which can be used for clamping a pipe or conduit and suspending such clamped pipe or conduit from an open-mouthed strut or channel bar. It will also be seen that, as shown in FIGS. 6 and 7, the clamp device of the invention totally isolates the conduit or pipe from contact with the channel bar, which may often be made of metal, and assures ventilation around the pipe or channel bar at the point where it passes through the clamp device.

Although a preferred embodiment of the invention has been illustrated in the drawings and has been herein described, it will be understood that various changes and innovations in the illustrated structure can be effected without departure from the basic principles which underlie this invention. Changes and innovations of this type are therefore deemed to be circumscribed by the spirit and scope of the invention, except as the same may be necessarily limited by the appended claims or reasonable equivalents thereof.

What is claimed is:

1. A pipe clamp device comprising:

an elongated flexible strap having a first side, a second side, a pair of opposed side edges, and a pair of opposite ends; and a pair of tee subassemblies connected to the opposite ends of the strap and each including:

a crossarm element having a tool-receiving slot therethrough in alignment with the longitudinal axis of said elongated strap for facilitating the twisting of said crossarm element about the longitudinal axis by means of a leverage tool inserted into said slot; and a flexible, resilient neck portion interconnecting the crossarm element with the respective end of said elongated strap.

2. A pipe clamp device as defined in claim 1 and further characterized as including a pair of stop flanges each having one side secured to one of said ends of said strap and extending transversely across the strap, and each having one of said neck portions secured to the opposite side thereof from said strap.

3. A pipe clamp device as defined in claim 1 and further characterized as including a plurality of said pipe spacing protuberances secured to, and projecting from, said first side of said strap.

4. A pipe clamp device as defined in claim 2 wherein each of said stop flanges is substantially rectangular in configuration and extends in a plane substantially normal to the main plane of said strap.

5. A pipe clamp device as defined in claim 4 and further characterized as including web portions adjacent opposite ends of the strap, and extending in an arc from said first side of the strap to said one side of one of said stop flanges, each of said web portions defining a concave surface formed on an arc of a circle.

6. A pipe clamp device as defined in claim 1 wherein each of said cross-arm elements includes a beveled side constituting a side of said slot, and a straight side constituting the opposite side of said slot.

7. A pipe clamp device as defined in claim 1 wherein said neck portion comprises:

a pair of substantially parallel lateral flanges; and plate means interconnecting said lateral flanges.

8. A pipe clamp device as defined in claim 7 wherein said crossarm element comprises:

a peripheral flange portion connected to said lateral flanges; and plate means connected to the plate means of said neck portion.

9. A pipe clamp device as defined in claim 4 wherein each of said stop flanges defines with an adjacent one of said crossarm elements, a pair of spaces located on opposite sides of one of said neck portions.

10. A pipe clamp device as defined in claim 4 wherein each of said stop flanges has a greater length than the transverse width of said strap, and projects outwardly from the opposite side edges of said strap.

11. A pipe clamp device as defined in claim 10 and further characterized as including gusset elements extending between the side edges of the strap and said stop flanges.

12. A pipe clamp device as defined in claim 10 wherein each of said stop flanges defines with an adjacent one of said crossarm elements, a pair of spaces located on opposite sides of one of said neck portions.

13. A pipe clamp device as defined in claim 12 and further characterized as including web portions adjacent opposite ends of the strap, and extending in an arc from said first side of the strap to said one side of one of said stop flanges, each of said web portions defining a concave surface formed on an arc of a circle.

14. A pipe clamp device as defined in claim 13 wherein each of said crossarm elements includes a beveled side constituting a side of said slot, and a straight side constituting the opposite side of said slot.

15. A pipe clamp device as defined in claim 14 wherein said neck portion comprises:

a pair of substantially parallel lateral flanges; and plate means interconnecting said lateral flanges.

16. A pipe clamp device as defined in claim 15 wherein said crossarm element comprises:

a peripheral flange portion connected to said lateral flanges; and plate means connected to the plate means of said neck portion.

17. A pipe clamp device as defined in claim 16 and further characterized as including a plurality of pipe spacing protuberances secured to, and projecting from, said first side of said strap.

18. A pipe clamp device as defined in claim 1 wherein said pipe clamp further includes locking tabs carried on the opposite ends of said crossarm element on opposite sides of said resilient neck portion and projecting from the crossarm element toward the flexible strap.

19. A pipe clamp device as defined in claim 7 wherein each of said parallel lateral flanges has an arcuate concavity therein.

20. A pipe clamp device as defined in claim 18 wherein said locking tabs at the opposite end of each crossarm element are located on opposite sides of the plane containing said first side of said strap.

21. A pipe clamp device as defined in claim 20 wherein the locking tabs carried on corresponding aligned ends of the two crossarm elements in said pair of tee subassemblies, which ends lie on the same side of one of said strap side edges, are located on opposite sides of the plane containing said first side of said strap.

22. A strut pipe clamp comprising:

an elongated flexible strap having opposite sides and opposite ends;

pipe spacing proturberances projecting from one side of the strap;

flange means secured to the opposite ends of the strap and having additional pipe spacing protuberances thereon, said flange means cooperating with said strap to form a pipe encirclement structure when said strap is bent through a 180° curve defined by its longitudinal axis; and a pair of tee subassemblies secured to said flange means and disposed on opposite ends of said strap, each of said tee subassemblies including:

a crossarm element including tool engaging means; and a flexible, resilient neck portion connecting said crossarm element to said flange means and spacing said crossarm element from said flange means.

23. A strut pipe clamp as defined in claim 22 wherein said flange means comprises:

a stop flange on each of the opposite ends of said strap; and arcuate web means extending between the strap and each of the stop flanges.

24. A strut pipe clamp as defined in claim 22 and further characterized as including locking tabs carried on the opposite ends of said crossarm element on opposite sides of said resilient neck portion and projecting from the crossarm element toward the flexible strap.

25. An assembly for supporting a tubular member comprising:

an elongated strut comprising:
- a web portion;
- a pair of opposed legs connected to said web portion and having a pair of in-turned edges defining an opening into said strut between said legs; and a flexible clamp suspended from said strut and including:
- an elongated, flexible strap of U-shaped configuration;
- a plurality of spaced pipe spacing protuberances connected to said strap and collectively arrayed in a substantially circular configuration;
- a pair of crossarm elements within said strut, extending substantially normal to the longitudinal axis of the strut and each resting upon the in-turned edges of said legs;
- a flexible, resilient neck portion connecting each of said crossarm elements to an end of said strap; and
- means disposed on at least one of said crossarm elements for engaging a tool to facilitate twisting the respective crossarm element on the respective flexible, resilient neck portion connected thereto, and relative to the longitudinal axis of the strut.

26. An assembly as defined in claim 25 wherein said flexible clamp is further characterized as including a pair of stop flanges extending substantially parallel to said crossarm elements, and cooperating with said crossarm elements to engage the in-turned edges of said strut legs.

27. An assembly as defined in claim 25 and further characterized as including means on the opposite ends of each of said crossarm elements locked over said in-turned edges.

* * * * *